United States Patent [19]
Jensen

[11] 3,744,223
[45] July 10, 1973

[54] LAWN MOWER APPARATUS
[75] Inventor: Warren Jensen, Atco, N.J.
[73] Assignee: Atco Enterprises, Atco, N.J.
[22] Filed: Mar. 31, 1972
[21] Appl. No.: 239,907

[52] U.S. Cl................. 56/10.2, 56/DIG. 15, 180/79
[51] Int. Cl............................................ A01d 75/00
[58] Field of Search............. 56/10.2, 10.5, DIG. 15; 180/79, 79.1, 79.5

[56] References Cited
UNITED STATES PATENTS
| | | | |
|---|---|---|---|
| 2,796,944 | 6/1957 | Clement | 56/DIG. 15 |
| 2,815,633 | 12/1957 | Meyer | 56/DIG. 15 |
| 2,259,193 | 10/1941 | Andrew | 56/DIG. 15 |
| 3,627,071 | 12/1971 | Haupt | 180/79 |

*Primary Examiner*—Antonia F. Guida
*Attorney*—John F. A. Earley

[57] ABSTRACT

Apparatus for controlling operation of a self-propelled lawn mower for moving a circular lawn area. The apparatus includes a reel located at the center of the circular area and a line wound on the reel and attached to a front corner of the lawn mower for controlling the lawn mower movement so that it moves in a decreasing spiral path to mow the circular area around the reel. A stop mechanism is provided for automatically stopping operation of the self-propelled mower when it nears the center of the spiral path near the reel.

9 Claims, 5 Drawing Figures

PATENTED JUL 10 1973  3,744,223

LAWN MOWER APPARATUS

BACKGROUND OF THE INVENTION

The invention relates generally to self-propelled lawn mowers and more particularly to lawn mowers which can operate unattended and are self-propelled to mow a predetermined area of a lawn.

The advantages of a self-propelled lawn mower of the indicated type in eliminating manpower are self evident. While various types of self-propelled lawn mowers have been provided, these prior art devices are very expensive to make and very complicated in operation and maintenance. Typical of these prior art devices are those shown in U. S. Pat. Nos. 2,521,262, 3,570,227, 3,550,714 and 2,941,346.

SUMMARY OF THE INVENTION

It is the general object of this invention to provide a self-propelled lawn mower which is operated unattended to mow a predetermined lawn area and the operation of which is terminated automatically at the end of this lawn mowing procedure. It is a feature of the invention to provide a lawn mower of the indicated type which is simple in construction, easy to maintain and simple in operation.

Briefly stated, the general object of the invention is achieved by the provision of an apparatus for controlling the operation of a power-operated, self-propelled lawn mower to mow a predetermined area by self-propelled operation which comprises a reel means anchored in a stationary position at the center of the lawn area to be mowed, a line means secured at one end of the reel means and at its other end on the front corner of the lawn mower so that as the lawn mower is self-propelled it will move in a decreasing spiral path around the reel means winding the line means thereon, and means for auotmatically stopping operation of the lawn mower at a location close to said reel means after said lawn area has been mowed.

DETAILED DESCRIPTION OF THE PREFERRED EMBODIMENT

While the invention will be described herein as adapted for use with a self-propelled lawn mower, it is applicable for use with other types of similar machines, such as tractors, planters and other agricultural machines. Thus, as used herein, the term "lawn mower" is intended to include, where appropriate, similar types of agricultural machines.

Figure 1:
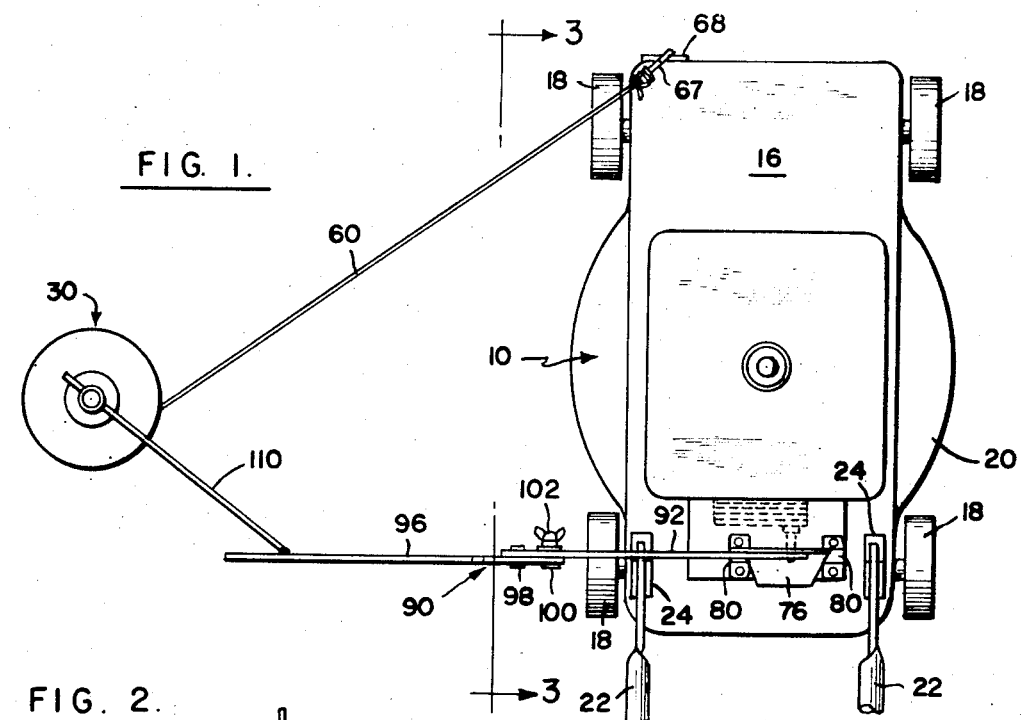
FIG. 1 is a top plan view showing the lawn mower apparatus in accordance with the invention.
Figure 3:
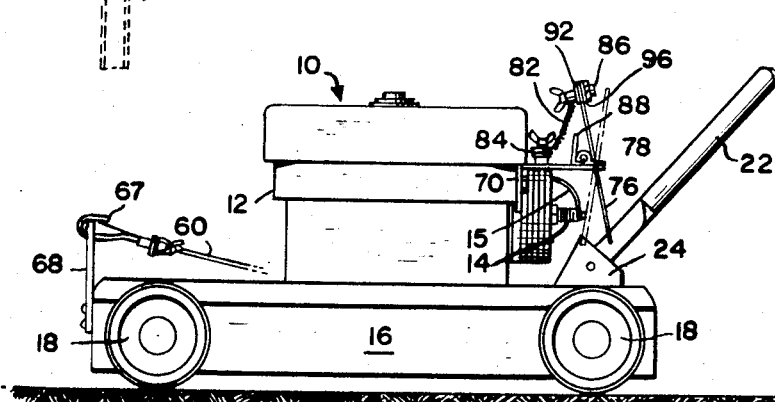
FIG. 3 is a side view of the apparatus shown in FIG. 1 taken generally on line 3—3 of FIG. 1.

In FIGS. 1 and 3 there is shown a conventional self-propelled lawn mower 10 of the rotary type which is powered by a gasoline engine 12. The engine 12 is bolted to the mower housing and is provided with the usual spark plug 14 for the ignition system which maintains operation of the engine. The sparking current is supplied to the spark plug 14 by way of a cable 15 from a spark generator as is conventional. The mower comprises the usual deck 16 and four wheels 18, the front pair of which are driven by the engine 12. There is also provided a discharge chute 20 which is arranged to discharge the cuttings from the side of the mower. A handle 22 is pivotally mounted on the rear part of deck 16 at a support means 24 and carries at its upper end the usual engine and drive controls (not shown).

Figure 4:
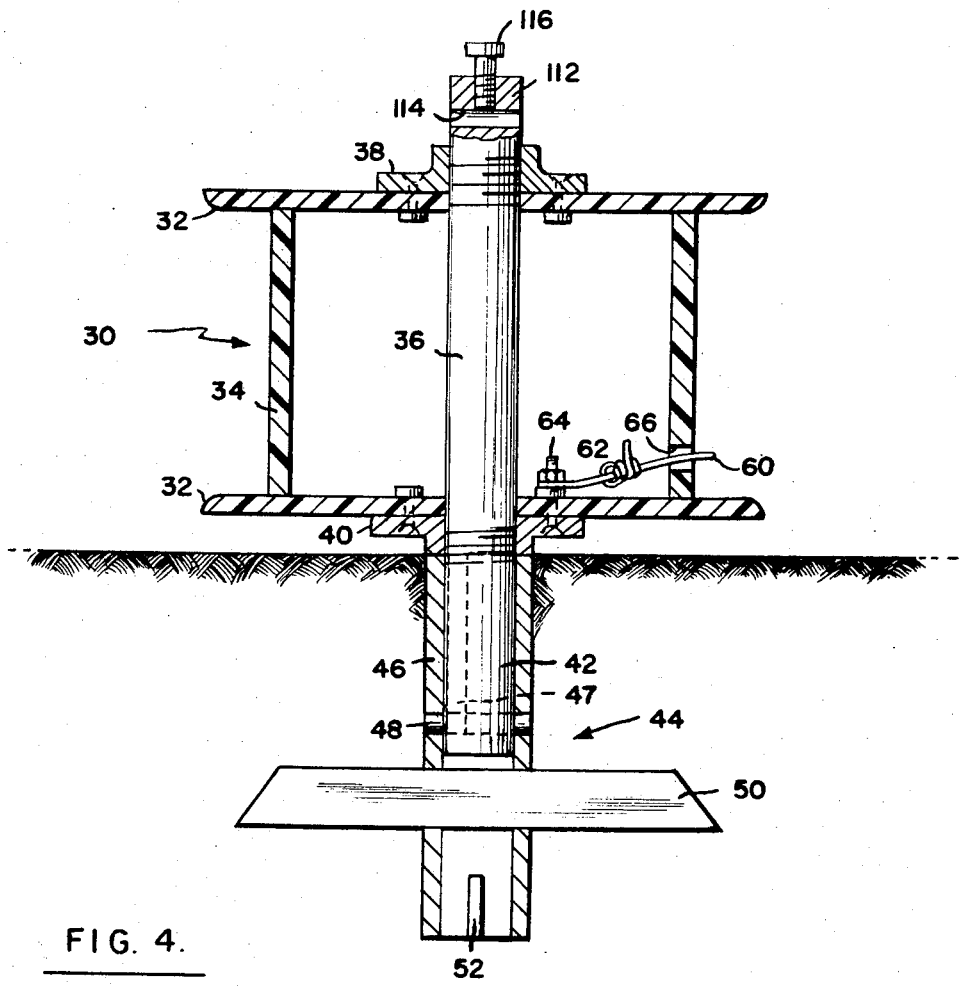
FIG. 4 is a sectional view of the reel means.

In accordance with the invention, apparatus is provided for attachment to the lawn mower 10 for controlling or guiding the self-propelled movement thereof in a decreasing spiral path about a central point to mow a generally circular area. Such means comprises a reel 30, preferably made of a strong plastic, and including a pair of disc-like ends 32 joined by a cylindrical portion 34. Reel 30 is mounted at its central portion on a pipe 36 by means of an upper collar 38 and a lower collar 40 secured to the upper and lower ends 32 by suitable mounting screws which cooperate with nuts as is shown in FIG. 4. The upper and lower collars 38 and 40 are adapted to engage the upper and lower ends of the central pipe 36.

Suitable means are provided for anchoring the reel 30 in the ground in the position shown in the drawings. Such means comprises a pipe 42, the upper end of which is threaddedly engaged with the lower collar 40 to extend downwardly therefrom into an anchoring means 44 securely mounted within the ground. The anchoring means 44 comprises a pipe 46 with its top flush with or below the surface of the ground. Pipe 46 is adapted to receive pipe 42 internally and is provided with a pair of slots 47 into which the outer ends of a pin 48 on pipe 42 are positioned. Each slot 47 consists of a vertical slot extending downwardly from the upper end of pipe 46 to join with a horizontal slot extending around pipe 46. Pipe 46 has a pair of anchor plates 50 and 52 extending laterally therefrom at generally right angles as shown in FIG. 4. These plates 50, 52 serve to securely anchor the pipe 46 in the ground. Also, since the pipe 42 is firmly positioned in the pipe 46, pipe 42 anchors the reel 30 in the ground as shown in FIG. 4. Pipe 42 is inserted into anchoring means 44 as desired by sliding both ends of the pin 48 into slots 47 and turning pipe 42 into locking position with both ends of pin 48 in horizontal portions of slots 47. Pipe 42 is removed from anchoring means 44 by turning pipe 42 into unlocking position and moving the ends of pin 48 upwardly in the vertical portions of slots 47.

There is provided a line means, preferably in the form of a plastic rope 60, which is connected between the reel means 30 and the lawn mower 10. To this end, the rope 60 has one end tied to a lug 62 mounted on the end of an extra long mounting screw 64 whihc is used to mount the lower collar 40 on the lower end 32 of the reel means 30. The rope 60 extends from lug 62 through an opening 64 in cylindrical portion 34 to the outside of the reel. As is best shown in FIGS. 1 and 3, the other end of the rope 60 is tied to a latch 67 removably connected to a bracket 68 mounted on the left front corner of the deck 16 of the lawn mower 10 as viewed in FIG. 1. Latch 67 is constructed to be releasably connected to bracket 68.

By reason of this arrangement, the line 60 serves to control the movement of the self-propelled lawn mower 10 in a path forming a decreasing spiral around the reel means 30. This is illustrated schematically in FIG. 5. It will be apparent that as the lawn mower is driven in a forward direction, the line will wind on the cylindrical portion 34 of the reel means 30. Accordingly, the lawn mower must move in a decreasing spiral path around the reel means 30. The sequential stages in this spiral movement are illustrated in FIG. 5.

It will be noted that with each revolution, the distance the lawn mower 10 is from the center of the reel is lessened by a distance equal to the circumference of the reel means. Accordingly, the reel 30 is designed so that this circumference is somewhat less than the cutting width of the lawn mower so as to insure that with each successive revolution, there is a slight overlap in the cutting path of the lawn mower. For example, with a conventional lawn mower having a 22 inches cutting width, the circumference is designed to provide for an overlap of two to three inches. Also, a typical length for the rope 60 is fifty feet so as to mow a generally circular area of lawn having a diameter of up to about a hundred feet.

Figure 5:
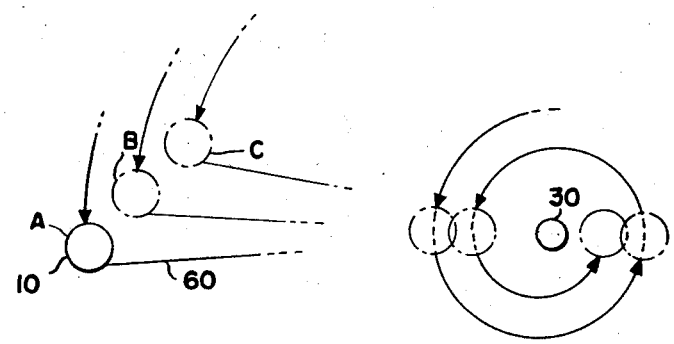
FIG. 5 is a schematic view illustrating the operation of the apparatus in accordance with the invention.

At the left in FIG. 5, there is shown at A, B and C three successive positions of the lawn mower 10 as it makes successive revolutions about the reel 30, it being apparent that there is an overlap in the cutting area. The movement of the mower 10 at the region close to the reel 30 is also shown in FIG. 5 and it is in this region where the line 60 is almost totally wound upon the reel 30.

Figure 2:
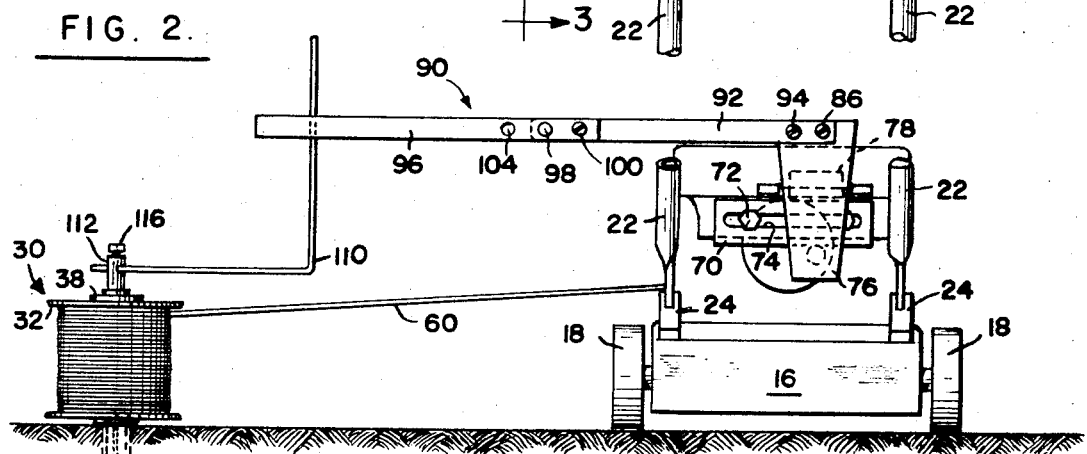
FIG. 2 is an end view of the apparatus shown in FIG. 1.

Means are provided for automatically stopping operation of the self-propelled lawn mower 10 at a location near the reel 30. In FIGS. 1 to 3, the parts are shown at a point when the lawn mower has reached the position whereat it is to be stopped.

To this end, there is provided a bracket 70 mounted on the lawn mower by means of a pair of bolts 72 which extend through a slot 74 in a vertically extending portion of bracket 70 into threaded engagement with the housing of the lawn mower. The bracket 70 is located so that a horizontally extending portion thereof extends over the spark plug 14. A plate 76 is pivotally mounted on a horizontal portion of the bracket 70 by means of a pin 78 secured to a central portion of plate 76, as by welding, and extending outwardly therefrom into a pair of pivot support members 80 welded onto the top of the horizontal portion of bracket 70. The ends of the pin 78 are rotatably mounted in these support members 80 to permit the plate 76 to be pivoted relative to the bracket 70 for a purpose to be described hereafter. The plate 76 is normally maintained in the position shown in solid lines in FIGS. 1 to 3 by means of a tension spring 82 which is connected in tension between a post 84 mounted on the horizontal portion of bracket 70 and a screw 86 mounted on the upper end of the stop plate 76. Bracket 70 is provided with a stop member 88 which extends vertically upwardly from the horizontal portion thereof to provide a limit for the pivotal movement of the plate 76 in the counterclockwise direction viewed in FIG. 3.

The bracket 70 is mounted on the lawn mower so that the lower end of the stop plate 76 is in alignment with the spark plug 14. The slot 74 permits the adjustable mounting of the bracket 70 to achieve this desired end. Accordingly, the plate 76 may be pivoted in a clockwise direction as viewed in FIG. 3 to come into contact with the outer end of the spark plug 14. The bracket 70, the plate 76, the pin 78 and the supports 80 are all made of metal, or another electrically conductive material, so that when the plate 76 is pivoted to place the lower portion thereof in contact with the end of the spark plug 14, there is provided a short circuit from the spark plug 14 to the mower, or ground, which serves to prevent the supply of a sparking current to the engine. This short circuiting position is shown in dotted lines in FIG. 3.

Means are provided for actuating the plate 76 from its normal position shown in solid lines in FIG. 3 to the dotted line position to stop operation of the lawn mower at a desired location close to reel 30. Such means comprises a contact arm, indicated generally at 90, which is mounted on the upper end of stop plate 76 to extend laterally from the side of the lawn mower 10. The contact arm means 90 is made of two parts, one part 92 being secured at one end by screw 86 and a screw 94 to the upper end of the plate 76. The contact arm means 90 also comprises a part 96 which is pivotally mounted on member 90 by a pin 98. Part 96 is secured in the position aligned with member 92 shown in FIGS. 1 and 2 by means of a screw 100 which extends through aligned openings in parts 96 and 92 and is engaged by a wing nut 102. Part 96 may be pivoted to a position adjacent member 92 by removing the screw 100, pivoting the member 96 180° about pivot 98 and then inserting the screw 100 through an opening 104 which is now aligned with the opening in member 92. The retracted position of member 96 is utilized when the mower is to be operated under manual control.

Means are mounted on the reel means 30 for contacting the arm means 90 to cause pivotal movement of plate 76 from the solid to the dotted line positions of FIG. 3. Such means comprises a rod 110 which has a horizontally extending portion mounted on a cylindrical support member 112 which is threadedly engaged at its lower end in the collar 38 as shown in FIG. 4. The horizontal portion of rod 110 is adapted to fit in a bore 114 in member 112 and to be locked in this position by a locking screw 116. Rod 110 is constructed and arranged so that its horizontally extending portion extends laterally from the top of the reel 30 a substantial distance to a point where a vertically extending portion thereof is arranged to come into contact with the arm means 90 as is shown in FIGS. 1 and 2.

In the use of the apparatus in accordance with the invention for mowing a predetermined area of a lawn, the first step involved is anchoring the reel means 30 in the ground at the center of the area to be mowed. Since this area is normally to be mowed repeatedly, there is usually provided some form of reel anchoring means permanently installed underground, such as the anchoring means 44 shown in FIG. 4. The reel means 30 is then mounted on the anchoring means by inserting the pipe 42 into slots 47 in the pipe 46 and placing the pins 48 in a locked position such as is shown in FIG. 4. The line 60 is then unwound from the reel and the latch 67 at its outer end is secured to the bracket 68 at the front left end of the mower as is best shown in FIG. 1. The mower, of course, has been placed at the circumference of the area to be mowed. The rod 110 and the arm means 90 are located in the positions such as shown in the drawings. The mower is then started and the drive engaged and allowed to proceed in a self-propelled movement from the starting position. As the mower proceeds unattended, it causes the line 60 to wind in a counterclockwise direction about the reel 30 as is viewed in FIG. 1. With each revolution, the mower moves closer to the center of the reel means and the mower moves in a decreasing spiral mowing the grass as it goes. It will be noted that the cuttings are discharged toward the outside of this spiral movement through the discharge chute 20 onto the portion of the lawn which has already been mowed so that the mower is not burdened with re-cutting the cuttings, as is preferable in grass cutting. When the mower reaches the point close to the reel means 30, such as is shown in FIGS. 1 and 2, the arm portion 96 comes into contact with the rod 110 and as the mower continues forward movement the plate 76 is pivoted from the solid line to the dotted line position shown in FIG. 3 to place the lower portion of the plate 76 into contact with the outer end of spark plug 14. This shorts the sparking circuit to ground and stops the operation of the engine, whereupon the lawn mower comes to rest at a position closely adjacent the reel means 30. However, prior to this, the lawn mower has mowed a generally circular area of lawn around the reel 30 at the center thereof.

It will be apparent that various changes may be made in the construction and arrangement of parts without departing from the scope of the invention. For example, the parts may be constructed of various configurations to adapt the same for mounting on various types of lawn mowers. Also, the mechanism may be adapted for use with lawn mowers having spark plugs at the front thereof.

I claim:

1. Apparatus for controlling the operation of a power-operated, self-propelled lawn mower or the like to mow a predetermined lawn area by self-propelled operation, comprising a reel means adapted to be anchored in a fixed position at the center of the lawn area to be mowed, line means secured at one end on said reel means, means for attaching the other end of said line means to a lawn mower so that as said lawn mower is self-propelled it moves in a decreasing spiral path around said reel means winding said line means thereon, and means for automatically stopping operation of said lawn mower at a location close to said reel means, said automatic stopping means including a rod means mounted on said reel means to extend therefrom into the path of said lawn mower as it moves close to said reel means, said line means being mounted on the lawn mower at a position lower than said rod means so that said line means is guided underneath said rod means as it winds on said reel means.

2. Apparatus according to claim 1 wherein said line means is attached to a front corner of the mower.

3. Apparatus according to claim 1 in which the circumference of said reel means is less than the cutting width of the lawn mower whereby there is an overlap in the cutting path of the lawn mower as it moves in said decreasing spiral path.

4. Apparatus according to claim 1 wherein said lawn mower is of the rotary type and is provided with discharge means for the grass on one side thereof, said means for securing said line means to the lawn mower being located at the front corner of said lawn mower near the side opposite said one side having said discharge means.

5. Apparatus according to claim 1 wherein said mower stopping means includes control means mounted on said lawn mower for movement from a first position which permits self-propelled operation of said lawn mower to a second position which stops self-propelled operation of said lawn mower, said control means being arranged to be contacted by said rod means to actuate the same from said firt position to said second position.

6. Apparatus according to claim 5 wherein said lawn mower is propelled by means of a gasoline engine powered by a spark plug, said control means including a plate pivotally mounted on said lawn mower for movement from a position clear of said spark plug to a position in contact with said spark plug, and means for grounding said plate when it is in said position in contact with said spark plug to thereby short circuit the power supply to said spark plug.

7. Apparatus according to claim 6 wherein said control means includes a contact arm mounted on said plate to project laterally from a side of said lawn mower, said rod means being arranged to contact said contact arm to actuate said plate to pivot from said position clear of said spark plug to said position in contact with said spark plug.

8. Apparatus according to claim 7 including means for anchoring said reel means in the ground at the center of said lawn area, said reel means having a member extending from the lower end thereof, said extending member carrying a laterally projecting pin means adapted to be removably engaged by said anchoring means.

9. Apparatus according to claim 7 wherein said contact arm is adapted to be collapsed to a retracted position and including means for biasing said plate to said position clear of said spark plug.

* * * * *